(12) United States Patent
Yoshida et al.

(10) Patent No.: US 7,108,085 B2
(45) Date of Patent: Sep. 19, 2006

(54) EQUALIZER BAR FOR A TRACK-TYPE VEHICLE

(75) Inventors: Tsuyoshi Yoshida, Katano (JP); Teiji Yamamoto, Kadoma (JP)

(73) Assignee: Komatsu Ltd., Tokyo (JP)

( * ) Notice: Subject to any disclaimer, the term of this patent is extended or adjusted under 35 U.S.C. 154(b) by 373 days.

(21) Appl. No.: 10/699,914

(22) Filed: Nov. 4, 2003

(65) Prior Publication Data

US 2004/0090048 A1    May 13, 2004

(30) Foreign Application Priority Data

Nov. 7, 2002   (JP)   ............... 2002-323512

(51) Int. Cl.
*B62D 55/108*   (2006.01)

(52) U.S. Cl. .............. 180/9.58; 280/124.166; 280/124.106

(58) Field of Classification Search ............... 180/9.58, 180/9.6; 280/124.166, 124.137, 124.149, 280/124.152, 124.106
See application file for complete search history.

(56) References Cited

U.S. PATENT DOCUMENTS

| | | | | |
|---|---|---|---|---|
| 1,429,449 A | * | 9/1922 | Norelius | ............ 180/9.6 |
| 2,631,844 A | * | 3/1953 | Paton | ............ 267/274 |
| 3,037,789 A | * | 6/1962 | Allison | ............ 280/124.152 |
| 3,198,275 A | * | 8/1965 | Royer | ............ 180/9.6 |
| 4,018,295 A | | 4/1977 | Hasselbacher | |
| 5,279,377 A | | 1/1994 | Oertley | |
| 5,358,064 A | | 10/1994 | Oertley | |

FOREIGN PATENT DOCUMENTS

| | | |
|---|---|---|
| JP | 05-92074 | 12/1993 |
| JP | 08-282553 | 10/1996 |

* cited by examiner

*Primary Examiner*—Paul N. Dickson
*Assistant Examiner*—L. McCreary, Jr.
(74) *Attorney, Agent, or Firm*—Posz Law Group, PLC; R. Eugene Varndell, Jr.

(57) ABSTRACT

An equalizer bar itself serving as a suspension device of a track-type vehicle has spring effects imparted through torsional deformation relative to vertical oscillatory movements of track frames. Arm portions are fixed in directions opposite to each other in two ends of an equalizer bar main body. Free end portions of the arm portions are individually supported in the track frames to be rotatable in directions opposite to each other. The track frames are therefore regulated in the magnitudes of oscillatory movements according to the spring effects of the equalizer bar main body, whereby travel-time oscillations, oscillatory movements, and/or the like of the vehicle body are sufficiently restrained.

4 Claims, 2 Drawing Sheets

EQUALIZER BAR FOR A TRACK-TYPE VEHICLE

BACKGROUND OF THE INVENTION

1. Field of the Invention

The invention relates generally to equalizer bar assemblies for use with various track-type vehicles for various works including, but not limited to, construction, civil engineering, and agricultural works. More specifically, the invention relates to an equalizer bar for implementing improvements of a track-type vehicle in ride quality, work efficiency, traveling stability, and the like.

2. Related Art

Work vehicles for carrying out various works such as construction and civil engineering works are driven to travel over soft and hard ground including mud, crashed stone debris, and the like. In addition, the vehicle is driven to travel over soft and hard ground such as unleveled ground including sharp slopes and continually irregular surfaces. As such, the work vehicles have track-type roller assemblies supported to be oscillatorily movable in right and left portions of the vehicle body via pivot shafts and an equalizer bar. Since the individual track-type roller assemblies are thus supported to the vehicle body via the pivot shafts and the equalizer bar, the vehicle body weight and the vertical loads imposed during travel of the vehicle over rough ground such as continually-irregular unleveled ground are commonly supported by the pivot shafts and the equalizer bar.

In general, the pivot shafts are provided in rearward portions of the vehicle body and are disposed there to protrude to two opposing sides in the vehicle-body width direction. The individual track frames of the track-type roller assemblies are each connected to be oscillatorily movable in the vertical direction about an axial portion of the pivot shaft in the rotational center. A central portion of the equalizer bar is supported to be oscillatorily movable in a forward side of the vehicle body through pins protrusively provided in a forward portion of the vehicle body in a direction perpendicular to the track frames. Both the right and left portions of the equalizer bar are rotationally connected to the individual track frames (such construction is disclosed in U.S. Pat. No. 5,358,064).

During the travel of the track-type vehicle over a continually-irregular unleveled ground, the track frames oscillatorily move in the vertical direction about the pivot shaft in the rotational center along the geometrical shape.

In line with the vertical oscillatory movement of the track frames, the equalizer bar oscillatorily moves in right and left directions perpendicular to the individual track frames about the axial portions of the pins in the rotational centers. When the equalizer bar oscillatorily moves greater than necessary, since end portions thereof strongly collide with the vehicle body, there arise problems in that oscillatory movements, oscillations, and the like of the vehicle body are also greater than necessary.

To solve the problems described above, the conventional track-type vehicle has an elastomeric bumper pad between the vehicle body and the equalizer bar. Thereby, even when the track-type vehicle oscillates greatly, the equalizer bar and the vehicle body mutually absorb the oscillatory shocks via the elastomeric pad not to directly collide with each other. In this manner, the vehicle regulates the oscillatory movements of the equalizer bar.

Nevertheless, however, similar to the equalizer bar disclosed in the specification of the U.S. Patent referenced above, conventional equalizer bars are formed of a lengthy cast block body having very high stiffness. As such, the conventional equalizer bars almost do not have a buffering function that serves during travel of the track-type vehicle. Because of the structural characteristics, when travel-time external forces such as oscillations and shocks transmitted from ground-engagement portions cannot be sufficiently absorbed, the characteristics such as ride quality and traveling stability are significantly degraded. This consequently causes fatigue of an operator to be increased, potentially leading to creation of the cause of disturbing safety operation.

The equalizer bar is formed of the block body longer than the width of the vehicle body. This entails increased outer dimensions of the equalizer bar, thereby increasing the weight of the vehicle. In addition, although the equalizer bar is formed of a material such as Si—Mn cast steel having high stiffness, the material is expensive.

A central portion of the equalizer bar is pin-connected to the vehicle body, and is thereby supported to be oscillatorily movable in the direction perpendicular to the individual track frames. However, in such a supporting structure of the equalizer bar, the rotational movement about the pins frequently exerts excessive forces on the pin-connected portions. This can make deformation, wear, damage, and/or the like to easily occur in the pin-connected portions, consequently arising additional a problem in durability.

SUMMARY OF THE INVENTION

The invention is now proposed to solve the conventional problems described above. Accordingly, a specific object of the invention is to provide an equalizer bar usable with various track-type vehicles for construction, civil engineering, and agricultural works, for example. The equalizer bar to be provided is simple in structure, small in the overall size, and light in weight. In addition, the equalizer bar enables manufacturing costs and product costs to be significantly reduced, and further enables improvements in various vehicle characteristics, including, but not limited to durability, ride quality, work efficiency, and traveling stability.

To this end, according to one aspect of the invention, there is an equalizer bar of a track-type vehicle comprises two ends individually supported by right and left track frames, and an equalizer bar main body formed of a bar member having a spring function.

In the equalizer bar according to the aspect of the invention, the bar member supporting the right and left track frames has spring effects imparted through torsional deformation. Accordingly, compared with the conventional cast equalizer bar, the stiffness can be significantly reduced, thereby enabling the vertical oscillatory movements of the track frames to be smoothly and securely restrained.

Similar to those in the conventional equalizer bar, the right and left track frames of track-type roller assemblies employed in the invention are individually supported to be oscillatorily movable in the vertical direction about pivot shafts in the rotational centers. The pivot shafts are protrusively provided in two opposing end portions of the vehicle body. In line with vertical oscillatory movements of the track frames, the equalizer bar main body is torsionally deformed relative to the vertical oscillatory movements. The torsional deformation imparts to the equalizer bar main body the spring effects that cause the right and left track frames to gradually perform oscillatory movements with low magnitude. Thereby, thee track-type roller assemblies are gradually engaged with the ground. Consequently, shocks to be imposed on the vehicle body can be reduced in magnitude, and significant improvements can be implemented in terms of various properties, including, but not limited to restraint of oscillations of the vehicle body, ride quality, work efficiency, operational stability, and traveling stability.

To decrease the weight, the equalizer bar main body may be formed by using a hollow pipe or any one of others including annular members and solid members each having not only the cross-sectionally circular shape but also a different cross-sectionally polygonal shape such as a rectangular shape. The equalizer bar main body has the simple structure having the torsion bar spring function. This significantly contributes to reduction in the manufacturing costs and product costs, consequently enabling the overall size to be reduced to implement reduction in the weight of the vehicle body.

According to another aspect of the invention, the equalizer bar main body is rotatably supported in the vehicle body, the equalizer bar further comprises a first arm portion and a second arm portion that are provided in right and left pairs and that are individually fixed in directions opposite to each other to two opposing end portions of the equalizer bar main body, and free end portions of the individual first and second arm portions are rotatably supported in the track frames.

In this aspect of the invention, the configuration avoids using the conventional supporting structure in which the central portion of the equalizer bar is pin-connected to the vehicle body to be supported so as to be oscillatorily movable in the right and left directions perpendicular to the track frames. Instead, the configuration of the invention employs a supporting structure that supports the central portion of the equalizer bar main body having the torsion bar spring function to be rotatable about the horizontal axis line in a vehicle-body width direction with respect to the vehicle body. Concurrently, the supporting structure supports the two opposing end portions of the equalizer bar main body to be rotatable in directions opposite to each other about the horizontal axis line in the vehicle-body width direction.

In this aspect of the invention, the equalizer bar is formed substantially into the shape of the letter "Z" with the first and second arm portions provided to effectuate the torsion bar spring function (operation). These arm portions extend in directions opposite to each other in the two opposing end portions of the equalizer bar main body having the torsion bar spring function. The equalizer bar main body may be formed by using, for example, general-purpose spring steel or induction-hardened medium-carbon steel. For the material of the arm portions, general-purpose high-stiffness steel may be used.

When the track-type vehicle is driven to travel on unleveled irregular ground, rocky ground, and/or the like, the track frames each oscillatorily moves in the vertical direction along the geometrical shape about the pivot shaft in the rotational center. In line with the vertical oscillatory movements, the equalizer bar main body exhibits spring effects generated by torsional deformation via the arm portions. As described above, the individual arm portions of the equalizer bar are supported to be rotatable in the directions opposite to each other about the horizontal axis line in the vehicle-body width direction. As such, when the track-type vehicle travels over convex ground, the track frames are regulated by the spring effects in terms of the magnitudes of the oscillatory movements thereof not to largely oscillatorily move in the vertical direction. Consequently, travel-time oscillations, oscillatory movements, and/or the like of the vehicle body can be sufficiently restrained.

In addition, since the equalizer bar main body, the individual arm portions, and the like are supported to be rotatable about the horizontal axis line of the vehicle-body width direction, the mounting space thereof can be reduced without interfering with the vehicle body. Moreover, since the configuration avoids using the conventional supporting structure that supports the equalizer bar by the pin-connection thereof to the vehicle body, the quality of the equalizer bar can be maintained for a long time.

According to a yet another aspect of the invention, the first arm portion extends in a direction opposite to a rotational center of the track frame from the equalizer bar main body being sandwiched, the second arm portion extends toward the rotational center of the track frame from the equalizer bar main body being sandwiched, and the first arm portion is set to be longer than a length of the second arm portion.

It is essential that the equalizer bar main body exhibits sufficient spring effects imparted through torsional deformation relative to the vertical oscillatory movements. As such, it is suitable to set the first arm portion extending in the direction opposite to the position of the rotational center of the track frame to be longer than the length of the second arm portion extending toward the position of the rotational center of the track frame.

The magnitude of the deformation can be appropriately regulated by appropriately setting dimensional and positional factors with respect to the position of the rotational center of each of the track frames. The factors are the length of each of the arm portions, the position used as the supporting center of the each arm portion of the track frame, and the distance between the supporting center of the arm portion and the rotational center of the track frame.

With the configuration described above, when the track-type vehicle travels over continually-irregular unleveled ground, imbalance between the right and left track frames is corrected, and ground-engagement pressure of the each track-type roller assembly can be securely maintained to be appropriate. The configuration enables smooth torsional deformation to be imparted to the equalizer bar main body via the individual arm portions without causing undue motion of the equalizer bar main body. Consequently, the configuration enables obtaining sufficient buffering effects serving to reduce the magnitude of the shock loads that are imposed on the track frames when the track-type roller assembles engage the ground.

DESCRIPTION OF THE PREFERRED EMBODIMENT

With reference to the accompanying drawings, a preferred embodiment of the invention will be described in detail hereinbelow.

Figure 1:
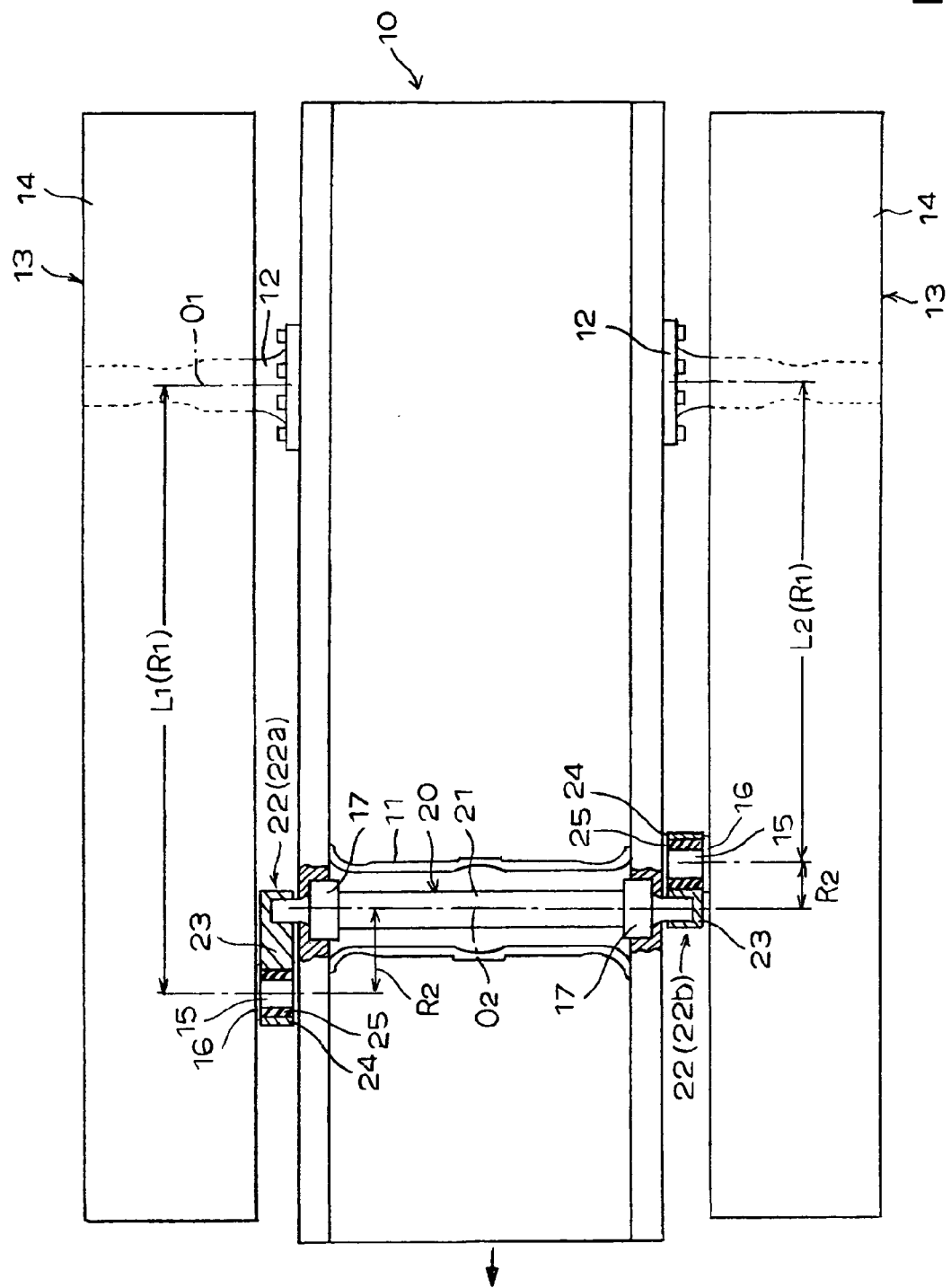
FIG. 1 is a plan view schematically showing an example of a suspension device by way of a representative embodiment of the invention.
Figure 2:
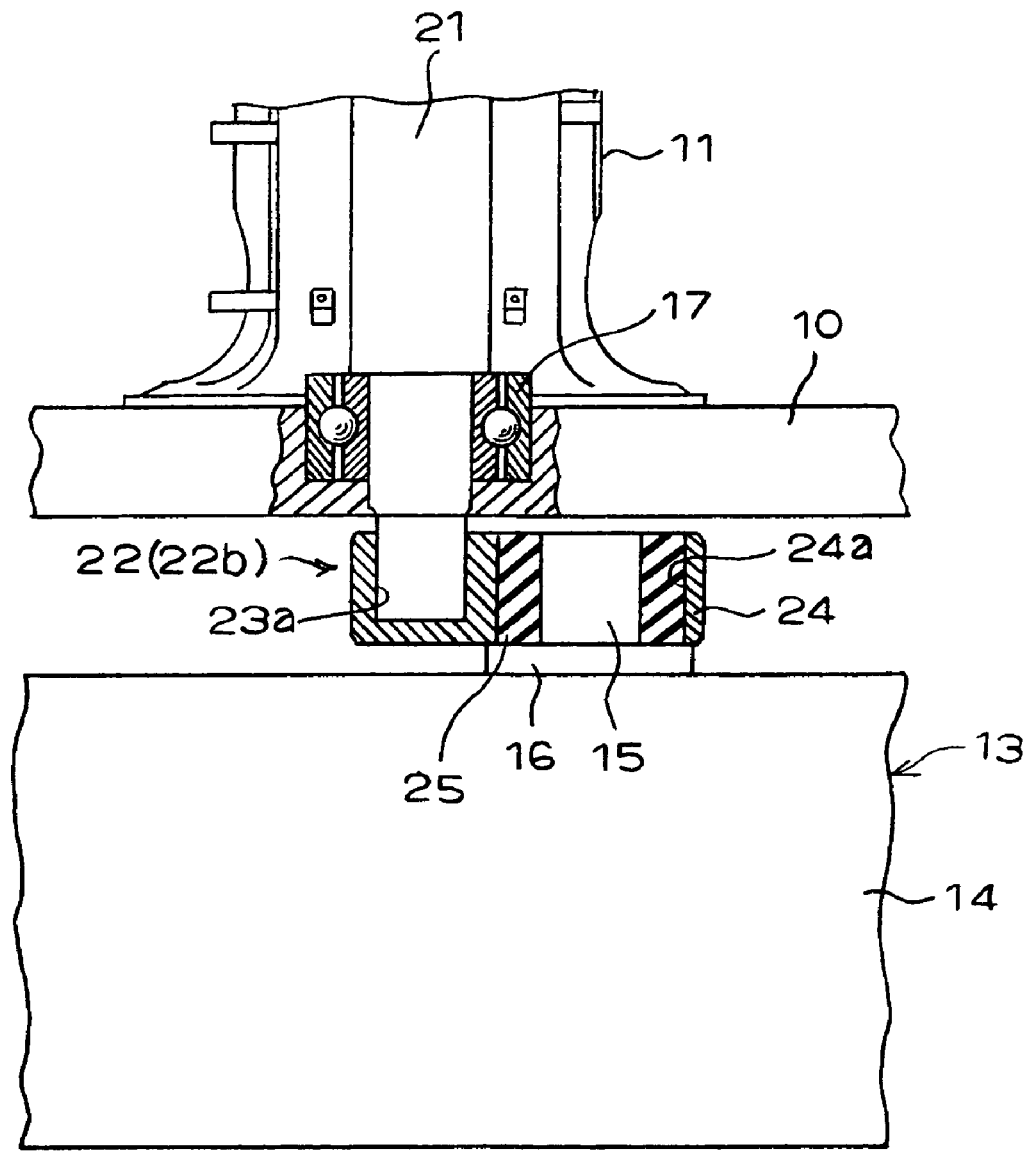
FIG. 2 is an enlarged cross-sectional view schematically showing major portions of an equalizer bar of the suspension device.

FIG. 1 is a plan view schematically showing an example of a suspension device by way of a representative embodiment of the invention. FIG. 2 is an enlarged cross-sectional enlarged view schematically showing major portions of an equalizer bar of the suspension device. While the embodiment will be described with reference to an example suspension device of a bulldozer, which is known as a construction/civil engineering work machine, the invention is not limited thereby. On the contrary, the invention may be advantageously used with suspension devices of various other track-type vehicles, such as agricultural machines and transportation machines.

Referring to the drawings, numeral 10 denotes a main frame constituting a major portion of a vehicle body of the bulldozer to which the invention has been applied. The main frame 10 is formed of, for example, weld-structural cast steel and rolled steel. Across member 11 is connected in a forward portion of the main frame 10. Pivot shafts 12 are provided along the same straight line to protrude in outward directions opposing each other in a rearward portion of the cross member 11 and in both right and left portions of the main frame 10.

Track-type roller assemblies 13 are disposed parallel to each other in both right and left portions of the main frame 10. The individual track-type roller assemblies 13 have track frames 14. The track frames 14 are each supported to be oscillatorily movable in the vertical direction via the pivot shaft 12. The track frames 14 are each formed of general-purpose structural steel to have a housing structure that has a substantially reversed U shape with a downwardly opening end.

The each track frame 14 is formed with a sprocket provided in a rear portion, an idler provided in a front side, a pair of front and rear carrier rollers provided in engagement with upper surfaces in intermediate portions, and traveling rollers (not shown) formed of a plurality of track rollers internally provided in front and rear portions in an intermediate portion. A track belt (not shown) is rotatably placed over the plurality of traveling rollers. The track belt is structured such that a plurality of ground-engaging track plates are bolted to an endless link chain. The track-type roller assembly 13 thus constructed has a conventionally well-known structure, so that the assembly 13 is of course not limited to the above-described type of the embodiment.

Mounting brackets 16 individually having supporting pins 15 are disposed in forward portions in the inner surface sides of the front and rear track frames 14. An equalizer bar 20 provided as a major feature member of the invention is connected via the supporting pin 15. The equalizer bar 20 is formed of an equalizer bar main body 21 formed of a substantially lengthy circular columnar bar member, and a first arm portion 22 (22a) and a second arm portion 22 (22b). The arm portions 22 are provided in two opposing end portions of the equalizer bar main body 21, and extend in directions opposite to each other. The equalizer bar main body 21 is formed to function as a torsion bar spring. The individual arm portions 22a and 22b are used as portions to effectuate the torsion bar spring function. The equalizer bar 20 is formed substantially into the shape of the letter "Z." The material of the equalizer bar main body 21 is not particularly limited to any specific one. The equalizer bar main body 21 may be formed by using, for example, general-purpose spring steel or induction-hardened medium carbon steel. In the embodiment, the two opposing end portions of the equalizer bar main body 21 undergo serration processing. However, the end portions may be formed elliptical or into any other shape such as a diameter-varying shape. The arm portions 22 are formed of high-stiffness steel. To decrease the weight, the equalizer bar main body 21 may be formed by using a hollow pipe or any one of others including annular members each having not only the cross-sectionally circular shape but also a different cross-sectionally polygonal shape such as a rectangular shape.

The equalizer bar main body 21 according to the illustrated embodiment is disposed above and adjacent the cross member 11, and is mounted on the main flame 10 to be rotatable about a horizontal axis line in the vehicle-body width direction via right and left bearings 17. Similarly, the individual arm portions 22, which are fixed to the two opposing end portions of the equalizer bar main body 21, are supported to be rotatable in the directions opposite to each other about the horizontal axis line. The individual supporting pins 15 of the track frames 14 are rotatably mounted in the free end portions of the individual arm portions 22.

In the configuration described above, the equalizer bar 20 can be mounted in a narrow space without interfering with main frame 10 or members in peripheral portions thereof. In addition, the configuration of the embodiment avoids using the supporting structure as is used in the conventional configuration of the equalizer bar. As such, since local great forces are not exerted on the equalizer bar, deformation, wear, and/or damage of the equalizer bar can be prevented.

It is essential that the equalizer bar main body 21 exhibits sufficient spring effects imparted through torsional deformation against the vertical oscillatory movements of the track frame 14. According to the illustrated example, the first arm portion 22a extends toward the side opposite to the mounted position of the pivot shaft 12 from the equalizer bar main body 21 being sandwiched between the first arm portion 22a and the second arm portion 22b. In addition, the first arm portion 22a is set to be longer than the length of the second arm portion 22b that extends toward the mounted position of the pivot shaft 12 from the equalizer bar main body 21 being sandwiched between the first arm portion 22a and the second arm portion 22b. Referring to FIG. 1, reference symbol L1 represents the distance between the supporting pin 15 of the vehicle-body right side (upper side in FIG. 1) and the pivot shaft 12 of the main frame 10. In addition, reference symbol L2 represents the distance between the supporting pin 15 of the vehicle-body left side (lower side in FIG. 1) and the pivot shaft 12 of the main frame 10. In the configuration, the distance L1 is set to be longer than the distance L2.

According to the configuration, the magnitude of the deformation can be appropriately regulated by appropriately setting dimensional and positional factors with respect to rotational center O1 of the each track frame 14. The aforementioned factors are the length of the each arm portion 22a or 22b, the position of the each supporting pin 15 of the track frame 14, and the distance between the each pivot shafts 12 and the equalizer bar main body 21. Thereby, a good right and left balance of the track frames 14 can be maintained during travel of the track-type vehicle over unleveled irregular ground. Concurrently, while maintaining the ground-engagement pressure balances of the track-type roller assemblies 13, the track-type vehicle can be driven to stably travel at an attitude not causing rollover.

The first and second arm portions 22a and 22b will be described hereinbelow in more detail. In the illustrated example (embodiment), since the first and second arm portions 22a and 22b on the right and left sides of the main frame 10 have the same structure, only the second arm portion 22b on the one side will be described. For the first arm portion 22a, the same member names and reference symbols/numerals are used to refer to substantially the same members as those of the second arm portion 22b.

With reference to FIG. 2, the second arm portion 22b has a bar-main-body press-fit end portion 23 and a pin press-fit end portion 24 (free end portion). The end portion 23 is used to press-fit and fix the end portion of the equalizer bar main body 21, and end portion 24 is used to rotatably support the axial portion of the supporting pin 15 of the track frame 14. In the bar-press-fit end portion 23, a bar press-fit concave opening 23a is formed into the shape of an inner peripheral surface that matches an outer peripheral surface of the end portion of the equalizer bar main body 21. Similarly, a pin press-fit opening 24a is formed in the pin press-fit end portion 24. A resilient-rubber cylindrical bushing 25 to be fitted onto the supporting pin 15 is coaxially fitted into and fixed to the inner peripheral surface of the pin press-fit opening 24a. With this configuration, in line with the vertical oscillatory movements of the track frame 14, the inner peripheral surface of the pin press-fit opening 24a oscillates in slidable engagement with the outer peripheral surface of the supporting pin 15 via the bushing 25.

During travel of the vehicle, when the each track frame 14 oscillatorily moves in the vertical direction about the axial portion of the pivot shaft 12 in the rotational center O1, the supporting pin 15 of the track frame 14 oscillatorily moves. Concurrently, in line with the pivotal movement of supporting pins 15 of the track frames 14, the arm portions 22a and 22b each oscillatorily move about the axial portion of the equalizer bar main body 21 as a rotational center O2. However, a rotational radius R1 of the supporting pin 15 with respect to the rotational center O1 as the center thereof is set to be different from a rotational radius R2 of the supporting pin 15 with respect to the rotational center O2 as the center thereof. Accordingly, the each arm portion 22a or 22b oscillatorily moves off the circularly arcuate track with the rotational radius R1. In consideration of the above, the configuration is designed to allow the each arm portion 22a or 22b to oscillatorily move off the circularly arcuate track with the rotational radius R1 through resilient deformation of the bushing 25. This prevents undue forces from being exerted on the individual arm portions 22a and 22b.

When the track-type vehicle is driven to travel on unleveled irregular ground, rocky ground, and/or the like, the track frames 14 each oscillatorily moves in the vertical direction along the geometrical shape about the pivot shaft 12 of the main frame 10 in the rotational center O1. Suppose now that the track-type vehicle travels over continually-irregular unleveled ground. In this case, since the arm portions 22a and 22b of the equalizer bar main body 21 is rotatably supported in directions opposite to each other about the horizontal axis line in the vehicle-body width direction, the equalizer bar main body 21 is torsionally deformed via the arm portions 22a and 22b in line with the vertical oscillatory movements of the track frame 14. The spring effects imparted through the torsional deformation serve to regulate the magnitude of the oscillatory movement of the track frame 14. As such, the track frames 14 gradually oscillatorily move without performing large and sharp oscillatorily movements in the vertical direction, thereby causing the track-type roller assemblies 13 to gradually engage the ground. Consequently, oscillations, oscillatory movements, and/or the like of the track-type vehicle can securely be restrained through rational cooperative operations without causing undue motion of the track frames 14.

As is apparent from the above description, the equalizer bar main body 21 of the embodiment has the spring effects imparted by the torsional deformation relative to the vertical oscillatory movements of the track frames 14. As such, compared with the conventional cast equalizer bar, the stiffness can be significantly reduced, thereby enabling the vertical oscillatory movements of the track frames 14 to be smoothly and securely restrained. In addition, the individual arm portions 22 of the equalizer bar main body 21 are supported rotatably in directions opposite to each other about the horizontal axis line in the vehicle-body width direction. Accordingly, smooth torsional deformation can be imparted to the equalizer bar main body 21 via the individual arm portions 22, so that sufficient buffering effects can be obtained to reduce shock loads on the track frames 14 as well as shocks on the track-type vehicle. Consequently, the embodiment enables significant improvements to be implemented for various factors, such as restraint of oscillation, ride quality, operability, and traveling stability. While the invention has been described referring to specific embodiment, it is to be understood that the invention is not restricted thereto. Further, the invention is of course inclusive of even the technical scope that could easily be modified by those in the art from the embodiment.

Thus, the suspension device using the equalizer bar according to the invention has characteristics as described hereunder. The individual arm portions of the equalizer bar are rotatably supported in directions opposite to each other about the horizontal axis line in the vehicle-body width direction. Accordingly, when the track-type vehicle travels over convex ground, the spring effects of the equalizer bar main body serve to sufficiently regulate the magnitudes of the oscillatory movements not to cause the track frames not to perform large oscillatory movement in the vertical direction. Consequently, travel-time oscillations, oscillatory movements, and the like of the vehicle body are sufficiently restrained.

Further, the equalizer bar main body, the individual arm portions, and the like are supported to be rotatable about the horizontal axis line of the vehicle-body width direction. Accordingly, the mounting space thereof can be reduced without interfering with the vehicle body. Moreover, the configuration of the invention avoids using the supporting structure using the pin-connection to the main frame as is used in the conventional configuration of the equalizer bar. Therefore, the quality of the equalizer bar can be maintained for a long time.

As above, while the invention has been described referring to specific embodiment, it is to be understood that the invention is not restricted thereto. Further, the invention is of course inclusive of even the technical scope that could easily be modified by those in the art from the embodiment.

What is claimed is:

1. An equalizer bar of a tracked vehicle, comprising:
    an equalizer bar main body formed of a bar member having a torsion bar spring function; and
    first and second arm portions, the first and second arm portions having a first end respectively fixed to opposing ends of the equalizer bar main body and a second end respectively pivoted to right and left track frames.

2. An equalizer bar of a tracked vehicle, comprising:
    two ends individually supported by right and left track frames; and
    an equalizer bar main body formed of a bar member having a spring function;
    wherein:
    the equalizer bar main body is rotatably supported in a vehicle body;
    the equalizer bar further comprises a first arm portion and a second arm portion that are individually fixed in directions opposite to each other to two opposing end portions of the equalizer bar main body; and
    free end portions of the individual first and second arm portions are rotatably supported in the track frames.

3. The equalizer bar according to claim 2, wherein:
the first arm portion extends in a direction opposite to a rotational center of the track frame from the equalizer bar main body being sandwiched;
the second arm portion extends toward the rotational center of the track frame from the equalizer bar main body being sandwiched; and
the first arm portion is set to be longer than a length of the second arm portion.

4. An equalizer bar of a tracked vehicle, comprising: two ends individually supported by right and left track frames; and an equalizer bar main body formed of a bar member having a torsion bar spring function, wherein the equalizer bar main body is rotatably supported in a vehicle body; the equalizer bar further comprises a first arm portion and a second arm portion that are individually fixed in directions opposite to each other to two opposing end portions of the equalizer bar main body; and free end portions of the individual first and second arm portions are rotatably supported in the track frames.

* * * * *